(12) United States Patent
Wilson et al.

(10) Patent No.: US 11,912,400 B2
(45) Date of Patent: Feb. 27, 2024

(54) LANDING GEAR STAY

(71) Applicant: Airbus Operations Limited, Bristol (GB)

(72) Inventors: Frazer Wilson, Bristol (GB); Declan Franks, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/953,861

(22) Filed: Sep. 27, 2022

(65) Prior Publication Data

US 2023/0095261 A1 Mar. 30, 2023

(30) Foreign Application Priority Data

Sep. 28, 2021 (GB) ..................... 2113865

(51) Int. Cl.
*B64C 25/26* (2006.01)
*B64C 25/14* (2006.01)

(52) U.S. Cl.
CPC .............. *B64C 25/26* (2013.01); *B64C 25/14* (2013.01)

(58) Field of Classification Search
CPC .................................. B64C 25/20; B64C 25/26
See application file for complete search history.

(56) References Cited

U.S. PATENT DOCUMENTS

| | | | |
|---|---|---|---|
| 2,444,319 A * | 6/1948 | Winter | B64C 25/26 244/102 SL |
| 2,667,316 A | 1/1954 | Winter et al. | |
| 4,047,681 A * | 9/1977 | Hartel | B64C 25/12 244/102 SS |
| 10,479,487 B2 * | 11/2019 | Acks | B64C 25/34 |
| 10,563,690 B2 * | 2/2020 | Himmelmann | B33Y 80/00 |
| 10,590,982 B2 * | 3/2020 | Himmelmann | F16C 7/02 |
| 11,142,305 B2 * | 10/2021 | Moine | B64C 25/22 |
| 11,230,370 B2 * | 1/2022 | Goldring | B64C 25/34 |
| 11,377,205 B2 * | 7/2022 | Woolcock | B64C 25/04 |
| 2009/0014582 A1 | 1/2009 | De Ruffray et al. | |
| 2012/0168561 A1 | 7/2012 | Salmon et al. | |
| 2018/0031028 A1 * | 2/2018 | Himmelmann | B22F 3/1017 |
| 2018/0201365 A1 * | 7/2018 | Acks | B64C 25/34 |
| 2019/0135416 A1 * | 5/2019 | Woolcock | B64C 25/20 |

(Continued)

FOREIGN PATENT DOCUMENTS

| | | |
|---|---|---|
| CN | 105775111 | 7/2016 |
| CN | 209539706 | 10/2019 |

(Continued)

OTHER PUBLICATIONS

Extended European Search Report for Application No. EP 22197538.6, 12 pages, dated Jan. 30, 2023.

*Primary Examiner* — Joseph W Sanderson
(74) *Attorney, Agent, or Firm* — Nixon & Vanderhye P.C.

(57) ABSTRACT

A variable length stay for an aircraft landing gear is disclosed having first and second sets of struts lying on different longitudinal axes that enable the stay to extend and contract by movement of the struts parallel to their axes. The stay may be locked in its extended and retracted configurations thus providing downlock and uplock functions for the landing gear. The struts of the stay may have an open and easy to inspect structure, have low friction kinematics, and do not need to telescope within each other or lie on a single common axis.

17 Claims, 7 Drawing Sheets

(56) References Cited

U.S. PATENT DOCUMENTS

| | | | | |
|---|---|---|---|---|
| 2019/0241256 A1* | 8/2019 | Moine | ................ | B64C 25/22 |
| 2020/0003251 A1* | 1/2020 | Himmelmann | ......... | B22F 10/20 |
| 2020/0018345 A1* | 1/2020 | Himmelmann | ........ | B23K 9/044 |
| 2020/0140067 A1* | 5/2020 | Mo | ...................... | B64C 25/26 |
| 2020/0231274 A1* | 7/2020 | Goldring | ................ | B64C 25/10 |
| 2021/0031905 A1* | 2/2021 | Lawson | ................ | F16B 39/10 |

FOREIGN PATENT DOCUMENTS

| | | |
|---|---|---|
| CN | 212056571 | 12/2020 |
| DE | 3133117 C2 * | 2/1987 |
| EP | 1 041 000 | 10/2000 |
| EP | 2 300 319 | 3/2011 |
| EP | 2 301 382 | 3/2011 |
| EP | 3 275 780 | 1/2018 |
| GB | 742309 | 12/1955 |
| GB | 809949 | 3/1959 |
| GB | 2551380 | 12/2017 |
| WO | 2009/150376 | 12/2009 |

\* cited by examiner

LANDING GEAR STAY

CROSS RELATED APPLICATION

This application claims priority to United Kingdom Patent Application GB 2113865.6 filed Sep. 28, 2021, the entire contents of which is hereby incorporated by reference.

BACKGROUND OF THE INVENTION

The present invention concerns aircraft landing gear, particularly retractable landing gear. More particularly, but not exclusively, this invention concerns a landing gear stay for a landing gear assembly. The invention also concerns landing gear including such a stay, an aircraft including such a stay, and a method of operating an aircraft including the performance of steps concerning such a stay.

A landing gear typically includes a main leg and one or more stays (for example drag stays, or side stays) via which the leg is connected to the rest of the aircraft structure. The stays assist with the transfer of loads between ground and airframe via the landing gear. Landing gear stays may be in the form of a folding stay, that folds as the landing gear moves between a deployed position (e.g. extended) and a stowed position (e.g. retracted). Some older commercial aircraft, such as the A300 and Concorde, have included landing gears with telescopic stays in which the stay extends or contracts by concentrically arranged tubular elements telescoping within each other, as the landing gear moves between its deployed and stowed positions.

A telescopic stay has a number of desirable features which probably accounts for their original selection on certain aircraft. The movement of the tubular elements along a common axis results in a small volume demand with virtually no swept volume, in the frame of reference of the stay, as it moves between its fully extended and fully contracted configurations. Such a small volume demand can be beneficial in terms of storage space required for the stay in the aircraft and/or in terms of parts that are exposed to the airflow around the aircraft in flight (aerodynamics, noise etc). Simple plain bearings and rotating joints can be used on at least one end of the stay, possibly both ends. Certain telescopic stays have also performed the function of a hydraulic actuator for assisting in deploying or stowing the landing gear.

Telescopic stays have largely been replaced by folding stays when designing and manufacturing modern day commercial aircraft of any significant size. While the dual function of stay and actuator being performed by the same device has certain advantages on light aircraft, the application on larger aircraft would result in a size of device that would be impractical particularly in view of the significant hydraulic fluid demand that would be required. Employing a telescoping structure without needing to be filled with hydraulic fluid for the purposes of actuation may result in a lower mass solution but requires consideration of how to avoid the voids within the tubular elements being contaminated with unwanted material/fluids, such as dirt and/or moisture. Folding stays avoid such disadvantages and also have the advantage of allowing for easy inspection of parts given that there are no hidden regions, as might be provided in the tubes of a telescopic stay. Folding stays do not have the advantages of low volume requirements, particularly in terms of the swept volume in use.

The present invention seeks to mitigate one or more of the above-mentioned problems or disadvantages. Alternatively or additionally, the present invention seeks to provide an improved landing gear stay.

SUMMARY OF THE INVENTION

According to a first aspect of the invention there is provided a stay for an aircraft landing gear. The stay comprises a first end and a second end, wherein one of the first and second ends is configured for attachment to a main leg of the landing gear and the other of the first and second ends is configured for attachment to aircraft structure, for example part of the airframe. The stay comprises a first set of one or more struts including at least one strut which has a first axis (e.g. a longitudinal axis) that extends in a direction from the first end towards the second end. The stay comprises a second set of two or more struts each having a respective axis (e.g. a longitudinal axis), extending parallel to and spaced apart from the first axis. The stay is moveable between a contracted configuration and an extended configuration. The struts of the first set and of the second set move parallel to the first axis as the stay moves between the contracted and extended configurations. In embodiments, the difference in length between the contracted configuration and the extended configuration of the stay corresponds to a difference in length of overlap between the first set of one or more struts and the second set of two or more struts. In embodiments, it may be that the first set of one or more struts includes one of the first and second ends of the stay, and the second set of two or more struts includes the other one of the first and second ends of the stay.

In an embodiment of the invention, the struts are tubular struts that lie on different, but parallel, axes. The volume occupied by the stay, and swept out during use of the stay, may be relative low and comparable with a telescopic stay. The resulting stay has a variable length that extends and contracts, and is made from tubular elements, and therefore may provide many of the advantages of a telescopic stay made from concentric tubular elements, while mitigating the disadvantages that might be associated with such a telescopic stay. With a telescopic stay employing hollow tubular elements (not filled with hydraulic fluid) moisture ingress can result in water collection and then freezing. Excluding water from the interior of a telescopic stay is not an easy problem to solve because the volume within the tubes inherently changes during each operation, and during flight water has a tendency to collect due the transient pressure/temperature/humidity cycle. In embodiments of the present invention, drainage from tubular elements is not something that would become safety critical.

In embodiments of the present invention, the structure of the stay is open, and there are no tubular elements which contain moving parts of important mechanisms that would thus be hidden from view and/or difficult to inspect. The open structure allows easy inspection and servicing.

In the case of a landing gear being deployed by freefall, having low friction at the very end of movement of the stay is advantageous in being able to guarantee a safe deployment and downlock of the landing gear. For example, there may need to be a very high degree of confidence that the stay and/or landing gear will reach the correct position for a locking mechanism to be able to lock the stay and/or landing gear in a particular position (e.g. stowed or deployed). In embodiments of the present invention, the struts of the stay may move relative to each other, and to the airframe and landing gear, and give rise to relatively little frictional resistance and with little change in friction effects at different positions of the stay. By contrast, the telescoping parts of a telescopic stay (i.e. not in accordance with the present invention) may provide increased friction effects at one or both ends of the stroke length of the stay, giving rise to extra undesirable design constraints/requirements.

It may be that the stay is configured to be in the extended configuration when the landing gear is in a deployed position. It is preferred however that the stay is configured to be in the contracted configuration when the landing gear is in a deployed position. Having the stay in its contracted configuration when the landing gear is deployed may provide better load handling abilities for the stay than if the stay were fully extended when the landing gear is deployed. It may be that the stay is configured to be in the extended configuration when the landing gear is in a stowed position.

The stay may have the ability to be locked at one end, and preferably both ends, of its travel. This may eliminate the need for a separate locking device for the purpose of holding the stay in a certain position and/or resisting movement away from that position. The stay may comprise a first locking mechanism for locking the stay in the contracted configuration (which may as noted above correspond to the landing gear being in a deployed position). The first locking mechanism may be a downlock mechanism. The stay may comprise a second locking mechanism for locking the stay in the extended configuration (which may as noted above correspond to the landing gear being in a stowed position). The second locking mechanism may be an uplock mechanism. There may be an embodiment in which a locking mechanism for locking the stay in the contracted configuration is either not provided or is not part of the stay yet the stay nevertheless comprises a locking mechanism for locking the stay in the extended configuration. The first and/or second locking mechanisms may in use be partly mounted on a part of, or be a part of, the stay and partly mounted on a different part of the aircraft, when the locking mechanism is unlocked. The first and/or second locking mechanisms may be arranged automatically to lock the stay in position, for example, as a result of the stay moving to an extreme end of its travel between the contracted and extended configurations. The first and/or second locking mechanisms may be spring-loaded. The first and/or second locking mechanisms may comprise an actuator arranged to lock and/or to unlock the stay in position. The first and/or second locking mechanisms may comprise a rotor and stator. The rotor may be arranged for rotation about a rotor axis between a locking position and an unlocked position. The stator may be provided in the form of an element mounted on, or integral with, an end of a strut of the stay. The locking position may be such that the rotor and stator engage so as to prevent relative motion of the rotor and stator in a direction parallel to the rotor axis. The unlocked position may be such that relative motion of the rotor and stator in the direction parallel to the rotor axis is permitted. For example, a stator, in the form of an element mounted on the end of a strut of the stay, may pass beyond a part of the rotor when the rotor is in its unlocked position, but be unable to be moved back again because that part of the rotor prevents such movement of the stator as a result of that part of the rotor moving in the way of the element on the strut when the rotor is rotated to its locking position. The locking mechanism may be arranged such that when in the locking position multiple interleaving elements, for example in the form of a screw-thread, of both the rotor and stator engage, so as to prevent motion of the rotor and stator apart in the direction parallel to the rotor axis.

A separate and/or further locking mechanism may be provided for locking the landing gear in its stowed configuration (e.g. a landing gear uplock device), which does not form, or connect with, any part of the stay. Such a separate/further (uplock) locking mechanism may negate the need for the stay to have its own uplock mechanism.

The first and/or second locking mechanisms may comprise a hook and pin (for example a roller, a catch or the like). The hook may be arranged to be retained on the pin when the locking mechanism locks the stay in position. The hook may be arranged to be disengaged from the pin when the locking mechanism is not locking the stay in position.

It may be that contact is maintained between each of the struts of the second set and at least one strut of the first set for the entire length of travel of the stay between its contracted configuration and its extended configuration. For example, the movement of the struts of the second set may be guided and supported by a strut of the first set. It may be that contact is maintained at least in part by means of one or more rollers. There may be one or more rollers which move with a strut of the first set, and thus relative to struts of the second set as the struts move relative to each other. There may be one or more rollers which move with one or more struts of the second set, and thus relative to a strut of the first set as the struts move relative to each other. The rollers may move along at least 25%, and preferably at least 50%, of the length of the strut they roll on in use.

It may be that at least one strut of the first set is more massive and/or wider than at least one strut of the second set. The struts may be cylindrical struts. The struts may each be in the form of a tubular member. In an embodiment, the first set of one or more struts is in the form of a single strut (e.g. major strut) and the second set of two or more struts is in the form of two, three or four only struts (e.g. minor struts). Two or more (and optionally all) of the second set of struts may, when the stay is in its contracted configuration, be evenly distributed around the circumference of a single strut of the first set. It is preferred that there are only two sets of struts of the stay. For example, the length of the stay when in its extended configuration is effectively determined by the lengths of the struts of the first and second sets (and any structure forming a fixed part of the struts), rather than there being extra struts or moving parts which contribute significantly to the overall maximum length of the stay.

The length of a strut of the first set preferably accounts for at least a quarter, and preferably at least one third, of the length of the stay when in its extended configuration. The length of a strut of the second set preferably accounts for at least a quarter, and preferably at least one third, of the length of the stay when in its extended configuration. The length of the stay when in its extended configuration is preferably more than 150% of the length of the stay when in its contracted configuration.

The stay may be a drag stay. The stay may be arranged to be mounted aft of the landing gear, when the landing gear is deployed. The stay may be a side stay.

In a second aspect of the invention, there is provided an aircraft landing gear comprising a stay. One of the first and second ends of the stay is attached to a main leg of the landing gear, for example by means of a rotating joint. The other of the first and second ends of the stay may be configured for attachment to the airframe of the aircraft or be so attached, for example also means of a rotating joint. Such simple rotating joints may ensure low friction throughout the full range of operation of the stay, and allow for simple, cost-effective, plain bearings with such joints. The stay may comprise a major strut which has a first axis extending in a first direction, and two or more minor struts each having a respective axis, extending parallel to and spaced apart from the first axis. The stay of the landing gear may be moveable between a contracted configuration and an extended configuration, the main strut and the minor struts moving parallel to the first axis as the stay moves between the contracted and extended configurations. It may be that the main strut has an exterior surface that supports and guides the movement of each of the minor struts as the stay moves between the contracted and extended configurations. The landing gear may be held in a deployed position (e.g. down position), at least in part, by the stay, for example when the stay is in its contracted configuration. The stay of the landing gear may comprise a lock mechanism that locks, preferably automatically, the stay in position as it moves from the extended configuration to its contracted configuration. The landing gear may be in the form of a nose landing gear. In embodiments, the shallow storage volume available for a nose landing gear may make the application of the invention to a nose landing gear particularly advantageous. The stay may be located aft of the landing gear when the landing gear is deployed. The stay may be one according to the invention as described or claimed herein.

In a third aspect of the invention, there is provided an aircraft including a landing gear comprising a stay. The landing gear may be one as described or claimed herein in relation to the second aspect of the invention and/or the stay may be one as described or claimed herein in relation to the first aspect of the invention. One end of the stay may be attached to structure of the aircraft (e.g. to the airframe or other structure not being the landing gear leg) and the other end to the landing gear (e.g. to the landing gear leg). The manner of attachment of the stay to the aircraft structure and/or landing gear may be via a rotating joint. The aircraft may be a fixed wing aircraft, for example a commercial passenger aircraft (or an aircraft capable of use in that capacity), for example an aircraft configured to transport more than fifty passengers, for example more than one hundred passengers. Alternatively, the aircraft may be a helicopter, drone or spacecraft.

In a fourth aspect of the invention, there is provided a method of operating an aircraft including an aircraft landing gear leg having a stay. The method may comprise a step of moving the aircraft landing gear leg to or from a deployed position. The landing gear stay may assist in supporting the landing gear leg in the deployed position. The landing gear stay may extend between, and provide a load path between, the landing gear leg and a different part of the aircraft. A first strut of the landing gear stay may move parallel to a longitudinal axis of the first strut and parallel to and alongside two or more further struts of the landing gear stay, so as to change the length of the landing gear stay as the aircraft landing gear leg moves to or from the deployed position. The axes of the two or more further struts of the stay are spaced apart from the longitudinal axis of the first strut. A locking mechanism of the stay may lock the first strut relative to the further struts when the landing gear is in its deployed position so as to restrict a change in length of the stay and thus restrict the movement of the landing gear leg from its deployed position. There may be a step of unlocking the locking mechanism of the stay so as to allow a change in length of the stay and thus allow the movement of the landing gear leg away from its deployed position. The step of the locking mechanism of the stay locking the first strut relative to the further struts may happen automatically as a result of the landing gear leg moving to its deployed position. There may be a step of an actuator unlocking the locking mechanism. Such an actuator may comprise an electric motor. Alternatively, or additionally, such an actuator may be a hydraulically powered actuator.

It will of course be appreciated that features described in relation to one aspect of the present invention may be incorporated into other aspects of the present invention. For example, the method of the invention may incorporate any of the features described with reference to the apparatus of the invention and vice versa. The struts of the first and second sets and their arrangement/operation may have application in relation to aircraft parts other than a landing gear stay. The locking mechanism (featuring a rotor and stator for example) may for example have application on other aircraft parts.

DESCRIPTION OF THE DRAWINGS

Embodiments of the present invention will now be described by way of example only with reference to the accompanying schematic drawings of which.

DETAILED DESCRIPTION

Figure 1:
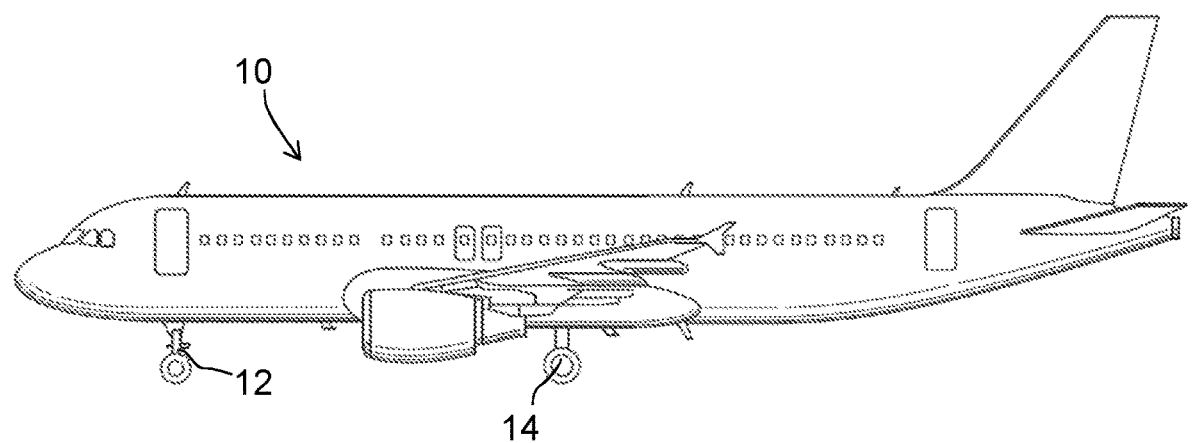
FIG. 1 shows a side view of an aircraft including a landing gear in accordance with embodiments of the invention.
Figure 2:
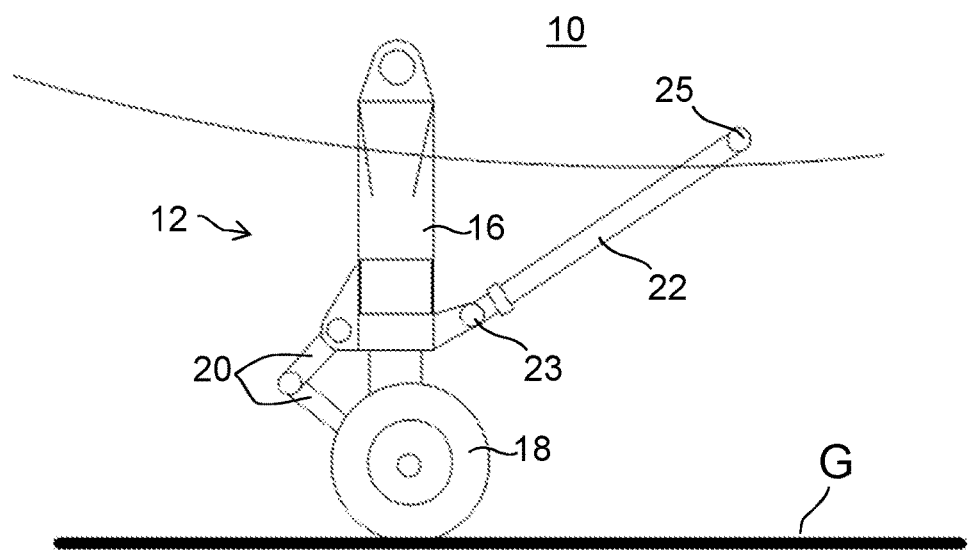
FIG. 2 shows a side view of a landing gear in accordance with an embodiment of the invention in the extended configuration, and on the ground.

FIG. 1 shows an aircraft 10 including a nose landing gear 12 and a main landing gear 14. FIG. 2 shows a side view of a nose landing gear 12 suitable for use in the aircraft 10 of FIG. 1. The landing gear is shown in FIG. 2 supporting part of the weight of the aircraft 10 when on the ground G. The landing gear 12 comprises a main leg 16 with wheels 18 mounted at the distal end (the lower end in FIG. 2). The main leg 16 incorporates a shock absorber and associated torque links 20. The shock absorber is shown in a compressed configuration in FIG. 2. A drag stay 22 is pivotally connected at one end to the main leg via a rotary joint 23 and at the other end to aircraft structure in or near the nose landing gear bay via a rotary joint 25. In this case, the aircraft structure to which the stay 22 is connected is the aircraft fuselage keel member, and is very close to the skin line, thus enabling the large towing drag loads to be absorbed in a structurally efficient manner.

Figure 3:
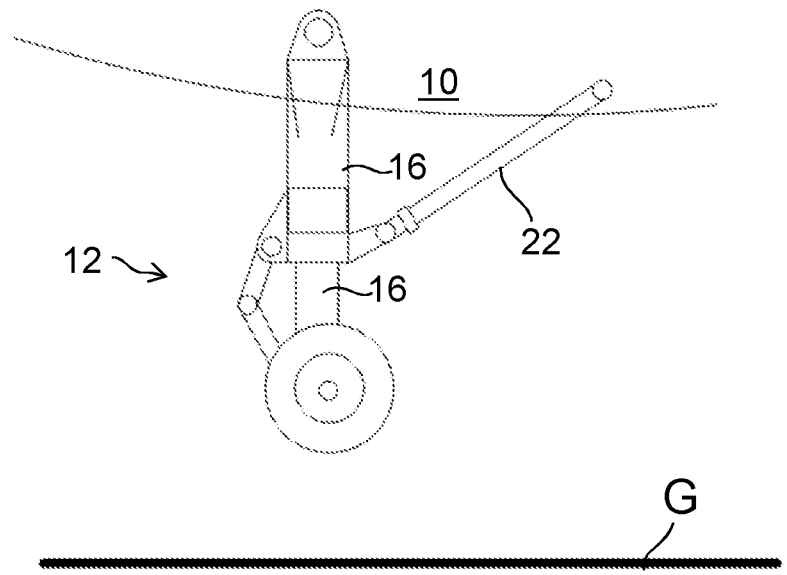
FIG. 3 shows a side view of the landing gear of FIG. 2 when airborne.
Figure 4:
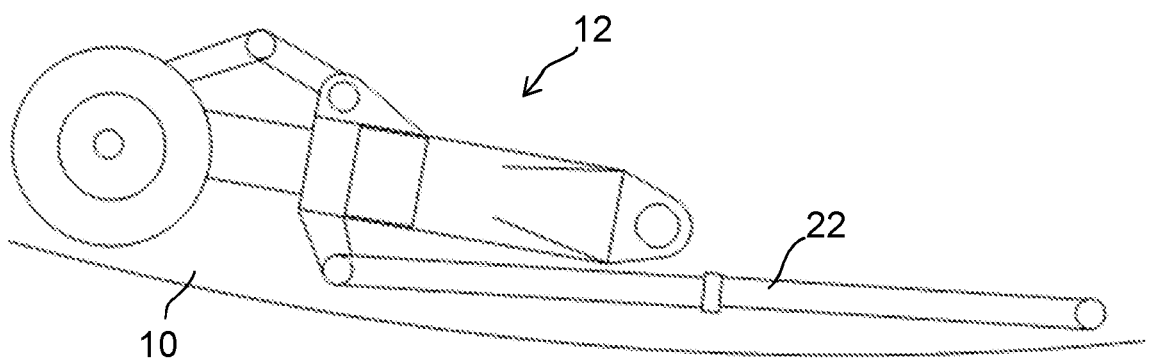
FIG. 4 shows a side view of the landing gear of FIG. 2 in the retracted configuration.

In FIG. 3, the shock absorber of the main leg 16 of the landing gear 12 is shown fully extended while the landing gear is deployed and the aircraft 10 is airborne. FIG. 4 shows the nose landing gear 12 stowed in a landing gear bay of the aircraft. It will be seen that the drag stay 22 moves from a fully contracted position when the landing gear 12 is deployed (FIGS. 2 and 3) to a fully extended position when the landing gear 12 is stowed (FIG. 4).

Figure 5:
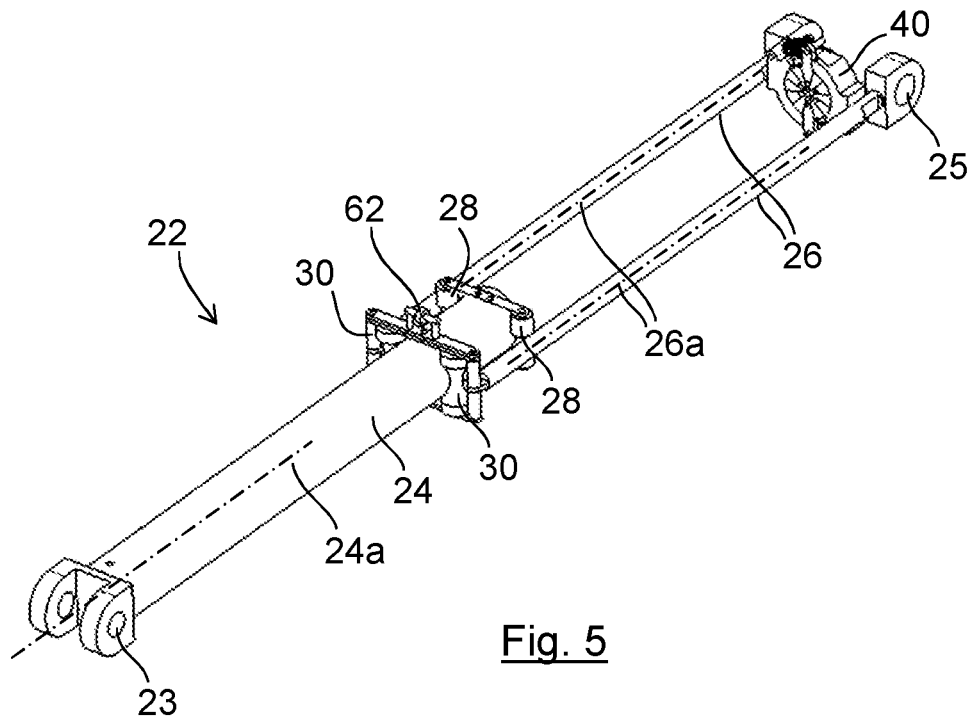
FIG. 5 shows a drag stay of the landing gear of FIG. 2 in an extended configuration.
Figure 6:
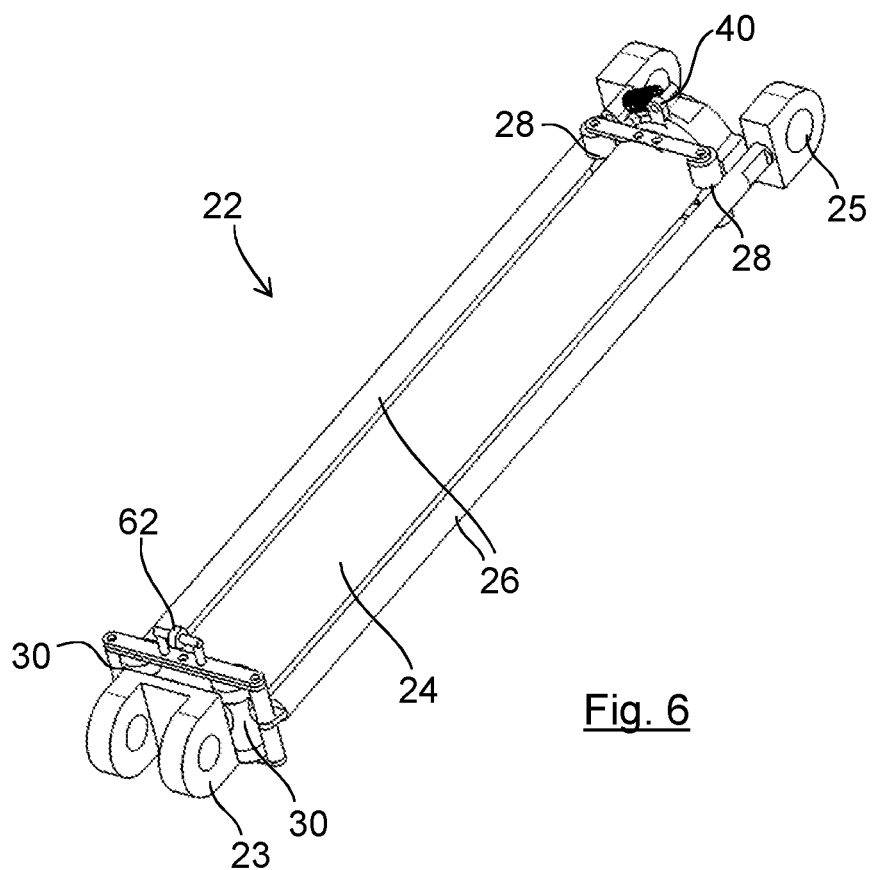
FIG. 6 shows the drag stay of FIG. 5 in a contracted configuration.

The drag stay is shown in greater detail in FIG. 5 (in an extended configuration) and FIG. 6 (in a contracted configuration). The drag stay 22 includes a single major strut 24 and two minor struts 26. Each strut has a generally cylindrical (with circular cross-section) tubular shape, the diameter (and the mass) of the major strut 24 being greater than (in this case, more than twice than) that of each of the minor struts 26. The longitudinal axis 24*a* of the major strut 24 and the axes 26*a* of the two minor struts 26 all extend parallel to each other and to the length of the stay, in the extended configuration, in the contracted configuration and while moving between the extended and the contracted configurations. In the contracted configuration (FIG. 6, in which the stay is shown at one extreme end of the stroke/length of travel of the struts relative to each other), the majority (greater than 75% in this case) of the length of each of the two minor struts 26 overlaps with the length of the major strut 24. In the extended configuration (FIG. 5, in which the stay is shown at the other extreme end of its stroke/length of travel), the length of overlap is less than 25% of the length of overlap that there is in the contracted configuration. The minor struts 26 are positioned symmetrically around the circumference of the major strut 24—in this case there are two minor struts so they are located one opposite the other (i.e. one to one side of the major strut, the other strut being on the opposite side of the major strut). It will be seen that the longitudinal axis 24*a* of the major strut 24 and the axes 26*a* of the two minor struts 26 are all spaced apart from each other by a distance that is at least as large as the diameter of the narrowest strut (i.e. a distance not less than the diameter of one of the minor struts 26). The tubular parts of the struts themselves are spaced apart from each other (no contact, other than via the rollers, mentioned below).

As the stay 22 moves between the contracted configuration and the extended configuration, the minor struts and the major strut move parallel to their axes 24*a*, 26*a*, being guided by two sets of rollers. A first set of rollers 28 is mounted on the end of major strut 24, each roller engaging with the outer surface of a respective minor strut 26 as the struts 24, 26 move relative to each other. A frame that connects the minor struts 26 at one end holds a second set of rollers 30, each roller engaging with the outer surface of the major strut 24 as the struts 24, 26 move relative to each other. Thus, for the entire stroke length of the movement of the stay 22 between its contracted and extended configuration, contact is maintained between the major strut 24 and each of the minor struts 26 by means of the rollers of the first and second sets of roller 28, 30.

While the struts 24, 26 of the stay move parallel to their axes, during the movement of the stay between its contracted and extended configurations, the entire stay and therefore the axes of the struts, rotate about the rotary joints 23, 25 that connect the stay at either end to the main leg and the aircraft structure, respectively. Parts of those rotary joints 23, 25 are shown in FIGS. 5 and 6.

As the stay moves to its fully contracted configuration, the landing gear being fully deployed (FIGS. 2 and 6), it locks into position by means of a downlock self-locking mechanism 40 (parts of which are visible in FIGS. 5 and 6). Similarly, as the stay moves to its fully extended configuration, the landing gear being stowed (FIGS. 4 and 5), it locks into position by means of an up-lock self-locking mechanism 60, a part 62 of which being visible in FIGS. 5 and 6.

Figure 7:
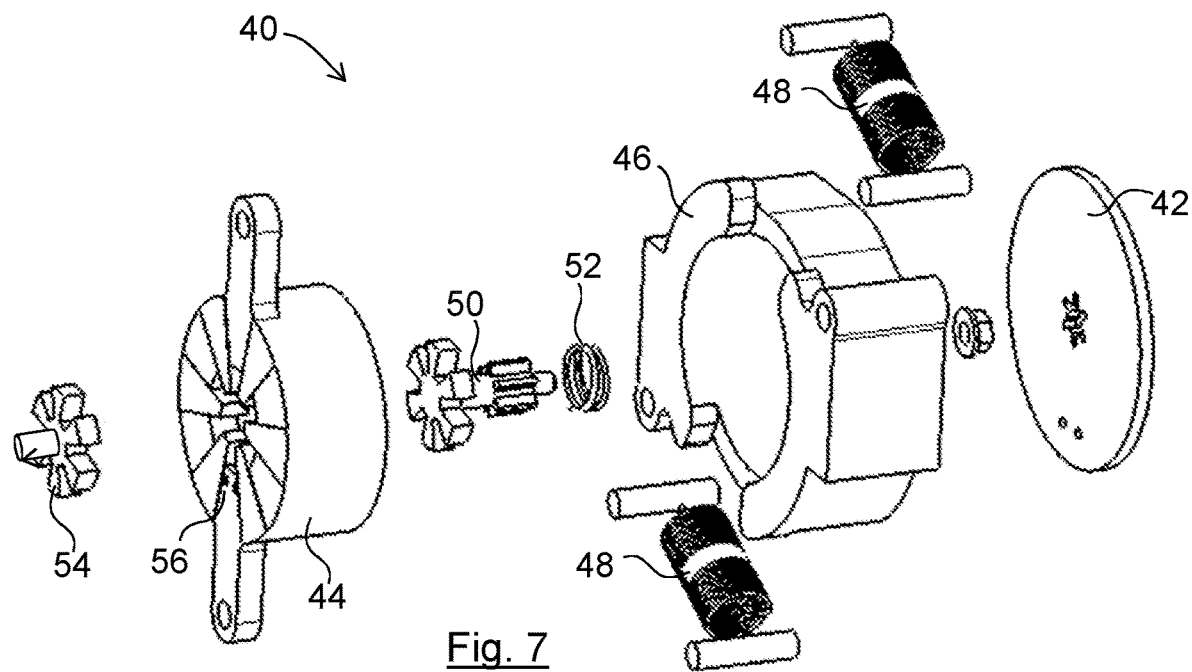
FIG. 7 is an exploded view of a downlock mechanism for the embodiment of the invention.
Figure 8:
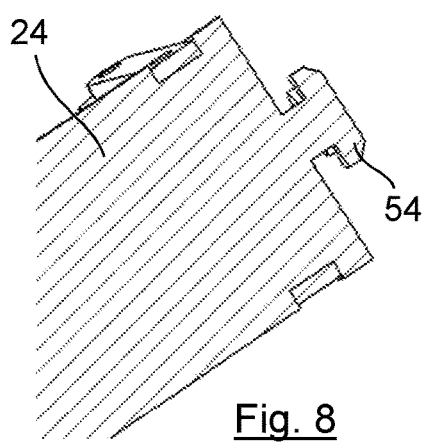
FIG. 8 is an sectional view of a stator part of the downlock mechanism.
Figure 9:
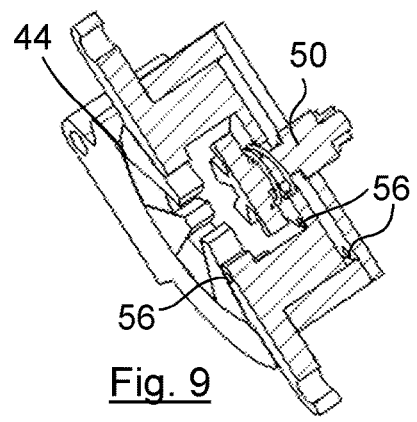
FIG. 9 is an sectional view including a rotor part of the downlock mechanism.
Figure 10:
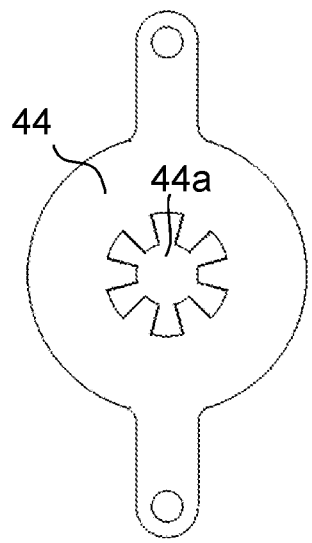
FIGS. 10 and 11 show the rotor part in open and closed positions respectively.
Figure 11:
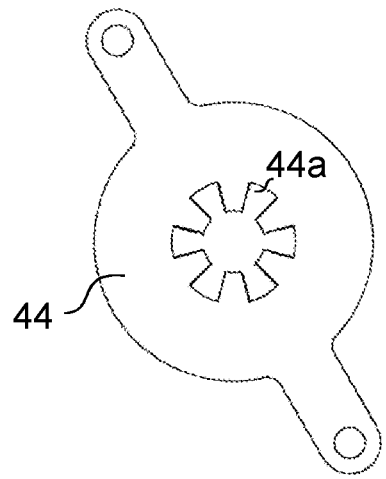
Figure 12:
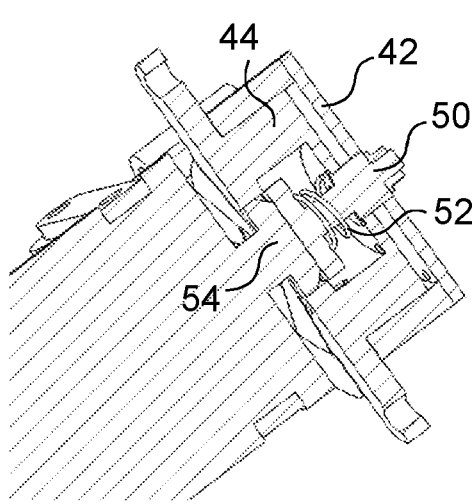
FIGS. 12 and 13 are sectional views showing the downlock mechanism in different stages of operation.
Figure 13:
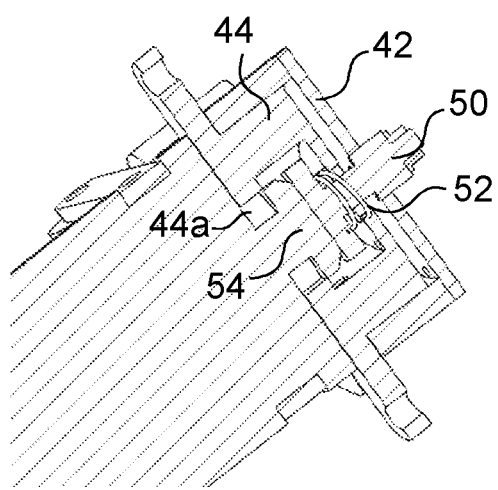

The downlock mechanism 40 and its operation is shown in greater detail in FIGS. 7 to 13. An exploded view of the main parts of the downlock mechanism 40 is shown in FIG. 7. The parts include a stator plate 42, rotor 44, housing 46, locking springs 48, lock spigot 50 and associated lock spigot spring 52, and a stay lock element 54. As shown more clearly in the sectional view of FIG. 8, the stay lock element 54 is fixedly mounted to the end of the main strut 24 of the stay, and may be considered as being a stator that interacts with the rotor 44. As the stay moves towards the fully contracted position, at the very end of the travel the stay lock element 54 passes through an aperture 44*a* of the rotor element that is shaped (see shape of aperture 44*a* as shown in FIG. 10) to allow passage of the stay lock element 54 when the rotor is in an open configuration and to prevent passage of the stay lock element 54 when in a closed configuration. Rotation of the rotor by 30 degrees moves the rotor 44 from the open configuration (FIG. 10) to the closed configuration (FIG. 11). The lock spigot 50 has an engaged position, in which it functions to keep the rotor 44 in the open configuration and in proper alignment as the stay lock element 54 enters the aperture. The rotational position of the lock spigot 50 is correctly maintained by the stator plate 42. As the stay lock element 54 enters the aperture it pushes (see FIG. 12) the lock spigot 50 from its extended and engaged position (in which it prevents rotation of the rotor) to a contracted and disengaged position (see the position shown in FIG. 9). Absent other forces, the lock spigot 50 is biased into its extended and engaged position by means of the spring 52. Further movement of the stay lock element 54 in the same direction eventually causes the stay lock element 54 to clear (exit) the aperture (see position shown in FIG. 13), allowing the rotor 44 to rotate about its axis. The locking springs 48 are loaded so as to bias the rotor 44 into its closed configuration, and as such at this stage the rotor 44 rotates to its closed configuration, thus preventing the (non-rotating, stator-like) stay lock element 54 from being passed back through the aperture. The stay 22 is therefore automatically locked in its fully contracted position and at this point, down lock of the landing gear is achieved.

Unlocking of the downlock mechanism 40 is achieved through reversal of the locking process outlined above, with the additional step of moving the rotor 44 against the bias of the springs 48 with an actuator in the form of an integrated electric motor (hydraulics, pneumatics or any other means of actuation are also suitable). Thus, during a landing gear retraction sequence, the rotor is moved to its open position by the actuator (not shown in the Figures), which then allows the stay lock element 54 to be withdrawn back through the aperture 44*a*. As a result of the bias from the lock spigot spring 52, the lock spigot moves back to its extended position within the aperture 44*a* of the rotor, thus engaging the rotor and preventing its rotation from the open position. The lock spigot 50 holds the rotor 44 in its position, with the lock springs 48 in tension. This ensures that the stay can achieve downlock in the event of loss of actuation power.

The downlock mechanism 40 includes fluid drainage paths 56 to reduce the risk of ice formation.

Figure 14:
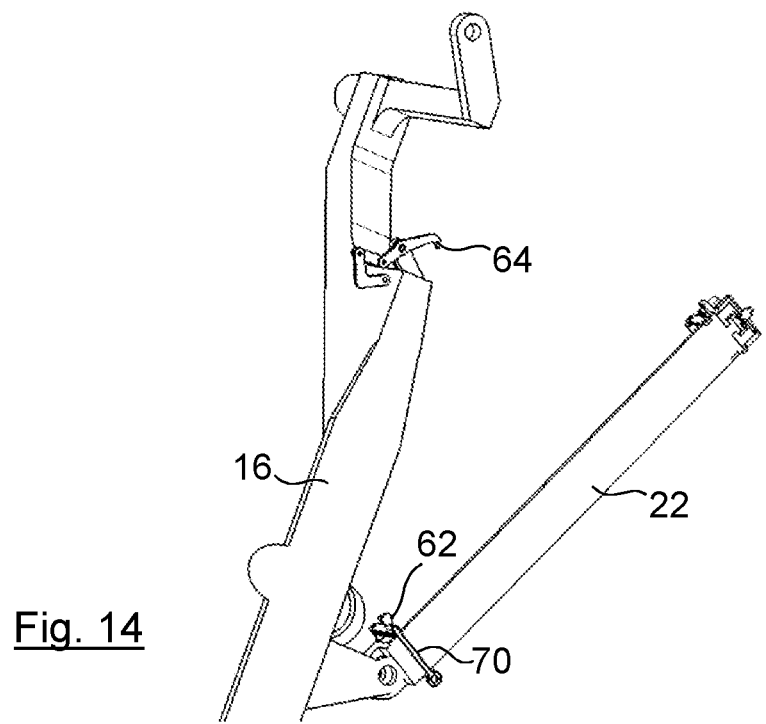
FIG. 14 is a perspective view of parts of the landing gear of FIG. 2 and the side stay, showing parts of an uplock mechanism when unlocked, the uplock mechanism being for use with the embodiment of the invention.
Figure 15:
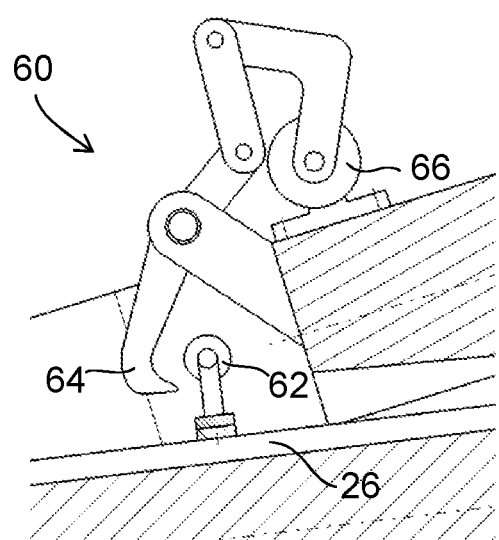
FIG. 15 is a cross-sectional view of the uplock mechanism when unlocked.
Figure 16:
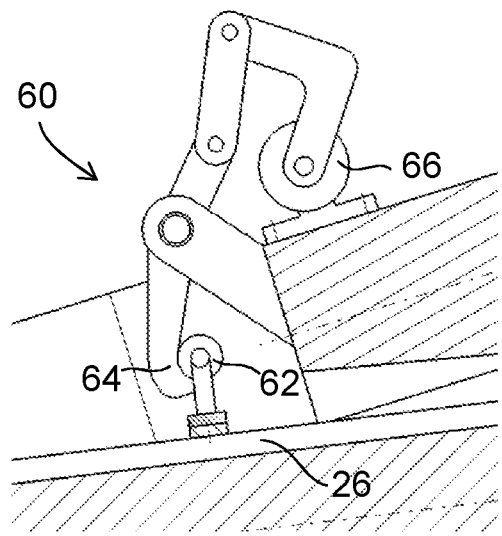
FIG. 16 is a cross-sectional view of the uplock mechanism when locked.

The uplock mechanism 60 and its operation is shown in greater detail in FIGS. 14 to 16. FIG. 14 shows the uplock mechanism 60 when disengaged; FIG. 15 shows a close-up view when the uplock mechanism 60 is unlocked; and FIG. 16 shows a close-up view when the uplock mechanism 60 is locked. The uplock mechanism 60 operates to allow for a self-locking structure when the landing gear is retracted and stowed in the nose landing gear bay in the airframe. A hook 64 mounted on the landing gear leg 16 is arranged to lock onto a rotatable pin 62 (or roller) mounted on the minor struts 26 (via the frame that holds the rollers 30 of the minor struts) when the stay 22 is fully extended. This inherently open (i.e. not enclosed or hidden) uplock mechanism 60 ensures inspectability and maintenance. A rotary actuator 66 (part only shown) is included to allow the uplock mechanism 60 to be unlocked.

With reference to FIG. 14, ground locking of the landing gear leg is made possible with the use of a ground lock pin arrangement 70. To lock the landing gear in its extended/deployed position, a pin 70 is passed through both an aperture in the major strut 24 and the frame that holds the rollers 30 of the minor struts 26. This then locks the stay 22 in its shortest position to enable safe ground service. Similarly, the same pin may be passed through the main stay (via a different aperture) and the frame that holds the rollers 30 of the minor struts 26 to lock the stay 22 in its longest position in which the landing gear in in its retracted and stowed position.

To summarise, the present embodiment concerns a variable length stay 22 for an aircraft landing gear comprising first and second sets of struts lying on different longitudinal axes that enable the stay to extend and contract by movement of the struts parallel to their axes. The stay may be locked in its extended and retracted configurations thus providing downlock and uplock functions for the landing gear.

This above described embodiment provides a stay which is structurally efficient when loaded in its contracted configuration. As such it is better suited to an aft drag stay configuration as illustrated. The present embodiment provides several advantages over hinging stays and telescopic stays. In particular, the present embodiment provides several advantages that would be possible with a telescopic stay but avoiding the disadvantages associated with having tubular parts (e.g. tubular struts) which need to telescope within each other and therefore lie on a single common axis. For example, the stay of the present embodiment provides an inherently open and therefore free draining structure and one which is easy to inspect. All major moving joints are in the form of rotating joints, ensuring low friction throughout its full range of operation and also enabling low cost plain bearings to be used. The kinematics and shape of the stay enable an arrangement requiring small volume demand with reduced/minimal swept volume. The space efficiencies allows stowage of the stay in a narrow and shallow bay volume and/or frees up volume in the landing gear bay above the stowed gear and hence opens up more space for other equipment. Landing gear retraction and extension kinematics are less constrained (lower friction mechanism made possible), possibly resulting in more structural efficiency for the aircraft attachment, landing gear and stay. The locking of the stay at both ends of its travel eliminates the need for a separate landing gear uplock mechanism. The stay has fewer safety critical fragile parts that are externally exposed to wear/risk of damage when in use. The tubular construction of the main structural elements of the stay, and the lower number of main elements (lower part count) required as compared to a typical conventional folding stay or telescopic stay, allow for simple and cost-effective manufacture.

Figure 17:
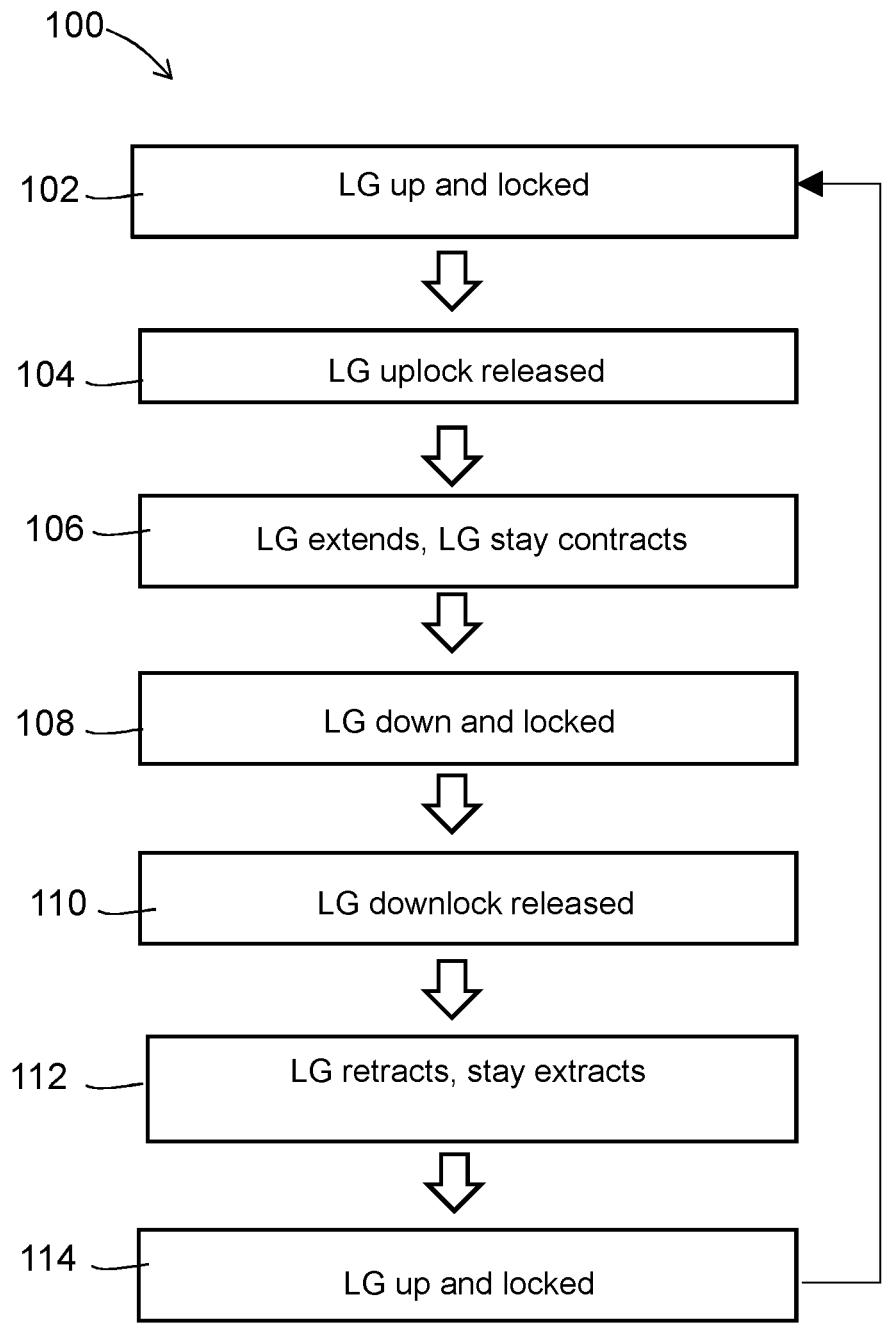
FIG. 17 shows a flow chart of an example method in accordance with an embodiment of the invention.

FIG. 17 shows a flow chart 100 of an example method of operating a landing gear in accordance with an embodiment of the present invention, e.g. with the use of a landing gear stay of any of the Figures as described above. An airborne aircraft comprises a landing gear ("LG") and a variable length drag stay for the LG. The LG is in its up and locked configuration (represented by box 102) with an uplock engaged. The uplock acts between the LG and the stay, preventing relative movement therebetween, and thus holding the LG in its up and stowed position. The LG uplock is released (step 104) by a dedicated actuator, allowing the LG to extend to its extended and deployed position (step 106). During this step, the stay moves with the LG. A first strut of the LG stay moves parallel to a longitudinal axis of the strut and parallel to and alongside two further struts of the stay. As such, the length of the stay reduces as the LG moves towards its deployed position. Once the LG is fully down, the stay is locked in its fully contracted state and provides a load path between the LG leg and a part of the airframe. The locking of the stay is achieved by fixing the length of the stay with a downlock locking mechanism that automatically (e.g. without needing the use of a separately powered actuator) locks the first strut relative to the other two struts. The stay in this locked state restricts the movement of the landing gear leg from its deployed position (this stage in the process being represented by box 108). The aircraft may then land and taxi. Following a subsequent take-off of the aircraft, the LG is then retracted and stowed. There is an initial step (box 110) of an actuator releasing the downlock. A different actuator then causes retraction of the LG, during which the length of the stay increases as the first strut of the stay moves away from the pair of further struts, the struts all moving parallel to their longitudinal axes as the LG retracts (step 112). The movement of the LG to the stowed position and/or the movement of the stay to its fully extended configuration automatically causes the uplock mechanism to lock the stay and LG in position, once the LG has moved to its stowed position. The LG is then once more in its up and locked configuration (114). The process may then be repeated when the aircraft needs to land again.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The stay could be adapted for use on the leading side of the landing gear, instead of the trailing side. More than two minor struts may be provided. The invention may have application to other types of stay or aircraft parts, for example, a side stay.

The locking mechanisms may be replaced with different locking mechanisms and/or the uplock and/or downlock mechanism may be used in other applications. For example, a hook lock could be used for both the uplock and the downlock locking mechanisms.

The above examples describe a nose landing gear, but it will be appreciated that the stay could be used as a stay on other landing gear, for example a main landing gear and/or a wing-mounted landing gear.

The struts could have a non-tubular form.

Other support bearing surfaces/bearing means could be used in replace of the rollers 28, 30.

The downlock mechanism as illustrated has a single-layer rotor 44 with engages with a single-layer lock element 54 of the major strut 24 of the stay (the element 54 acting as a stator). Thus, the locking design is shown as having two layers, one stator and one rotor. This could be adapted with the use of multiple layers of stators and rotors and be in the form of a traditional interrupted screw lock (screw thread, but with sectors of the screw thread being removed/not present—and thus "interrupted").

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear comprising a main landing gear leg and a stay attached to the leg at one end and being configured for attachment to aircraft structure at an opposite end, wherein the stay comprises:
   a major strut which has a first axis extending in a first direction,
   two or more minor struts each having a respective axis, extending parallel to and spaced apart from the first axis,
   and wherein
   the stay is moveable between a contracted configuration and an extended configuration, the main strut and the minor struts moving parallel to the first axis as the stay moves between the contracted and extended configurations, and
   the main strut has an exterior surface that supports and guides the movement of each of the minor struts as the stay moves between the contracted and extended configurations.

2. The aircraft landing gear according to claim 1, wherein the stay is configured to be in the contracted configuration when the landing gear is in a deployed position.

3. The aircraft landing gear according to claim 1, further comprising a first locking mechanism for locking the stay in the contracted configuration.

4. The aircraft landing gear according to claim 3, further comprising a second locking mechanism for locking the stay in the extended configuration.

5. The aircraft landing gear according to claim 1, further comprising at least one locking mechanism for locking the stay in the contracted configuration or in the extended configuration, and the at least one locking mechanism comprises a spring-loaded lock that is arranged automatically to lock the stay in position as a result of the stay moving to an extreme end of its travel between the contracted and extended configurations.

6. The aircraft landing gear according to claim 1, further comprising at least one locking mechanism for locking the stay in the contracted configuration or in the extended configuration, and the at least one locking mechanism comprises a rotor and stator, the rotor being arranged for rotation about a rotor axis between (a) a locking position in which the rotor and stator engage so as to prevent relative motion of the rotor and stator in a direction parallel to the rotor axis, and (b) an unlocked position in which relative motion of the rotor and stator in the direction parallel to the rotor axis is permitted.

7. The aircraft landing gear according to claim 1, further comprising at least one locking mechanism for locking the stay in the contracted configuration or in the extended configuration, and the at least one locking mechanism comprises a hook and pin, the hook being retained on the pin when the locking mechanism locks the stay in position and the hook otherwise being disengaged from the pin.

8. The aircraft landing gear according to claim 1, wherein contact is maintained between each of the minor struts and the major strut for the entire length of travel of the stay between its contracted configuration and its extended configuration.

9. The aircraft landing gear according to claim 8, wherein contact is maintained at least in part by means of one or more rollers.

10. The aircraft landing gear according to claim 1, wherein the major strut is more massive and/or wider than at least one of the minor struts.

11. The aircraft landing gear according to claim 1, wherein the two or more minor struts is in the form of two, three or four only struts which, in the contracted configuration, are evenly distributed around the circumference of the major strut.

12. The aircraft landing gear according to claim 1, wherein the stay is attached to the leg of the landing gear by means of a rotating joint.

13. An aircraft landing gear according to claim 1, wherein the landing gear is held in a deployed position, at least in part, by the stay, when in the contracted configuration, and the stay comprises a lock mechanism that automatically locks the stay in position as it moves from the extended configuration to its contracted configuration.

14. An aircraft landing gear according to claim 1, wherein the landing gear is a nose landing gear and the stay is located aft of the nose landing gear when the landing gear is deployed.

15. An aircraft comprising the landing gear according to claim 1, wherein the stay is attached to structure of the aircraft, other than the main leg of the landing gear, by means of a rotating joint.

16. A method of operating an aircraft including an aircraft landing gear leg comprising the steps of:
   moving the aircraft landing gear leg to or from a deployed position,
   assisting in supporting of the landing gear leg in the deployed position using a landing gear stay, the landing gear stay extending between the leg and a different part of the aircraft and providing a load path between the landing gear leg and the different part of the aircraft,
   a first strut of the landing gear stay moving parallel to a longitudinal axis of the first strut and parallel to and alongside two or more further struts of the landing gear stay so as to change the length of the landing gear stay as the aircraft landing gear leg moves to or from the deployed position,
   a locking mechanism of the stay locking the first strut relative to the further struts when the landing gear is in its deployed position so as to restrict a change in length of the stay and thus restrict the movement of the landing gear leg from its deployed position, and unlocking the locking mechanism of the stay so as to allow a change in length of the stay and thus allow the movement of the landing gear leg away from its deployed position.

17. A method according to claim 16, wherein locking the first strut relative to the further struts happens automatically as a result of the landing gear leg moving to its deployed position, and an actuator causes the unlocking of the locking mechanism.

\* \* \* \* \*